(No Model.)  2 Sheets—Sheet 1.
S. E. ROBINSON.
FOOD COOKER.
No. 359,229. Patented Mar. 8, 1887.
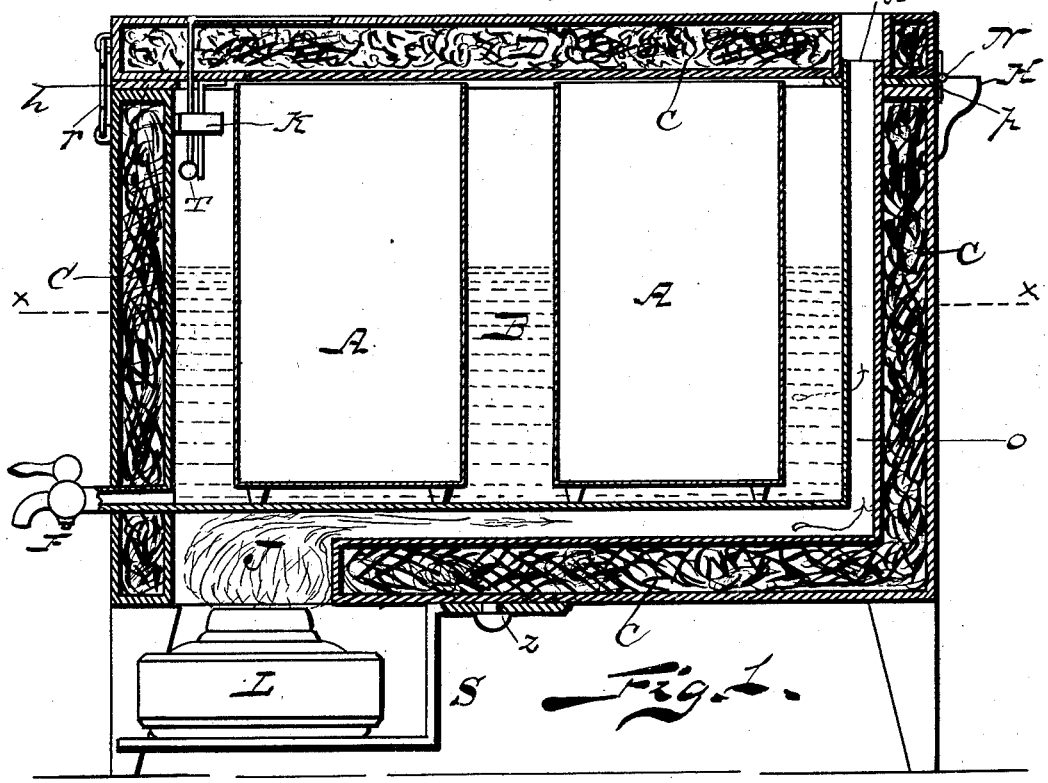
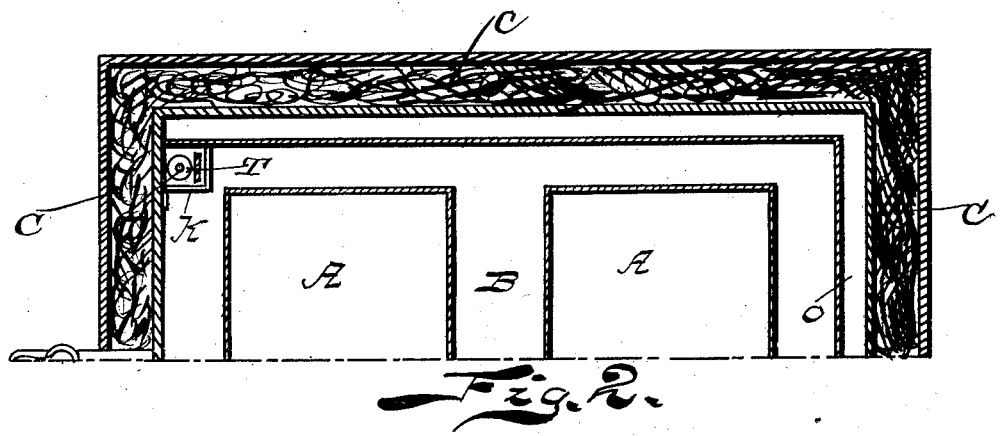
WITNESSES
A. D. Clarke
Frank Payne.
INVENTOR
S. E. Robinson
by E. H. Butler
Attorney
N. PETERS, Photo-Lithographer, Washington, D. C.

(No Model.) 2 Sheets—Sheet 2.
S. E. ROBINSON.
FOOD COOKER.
No. 359,229. Patented Mar. 8, 1887.
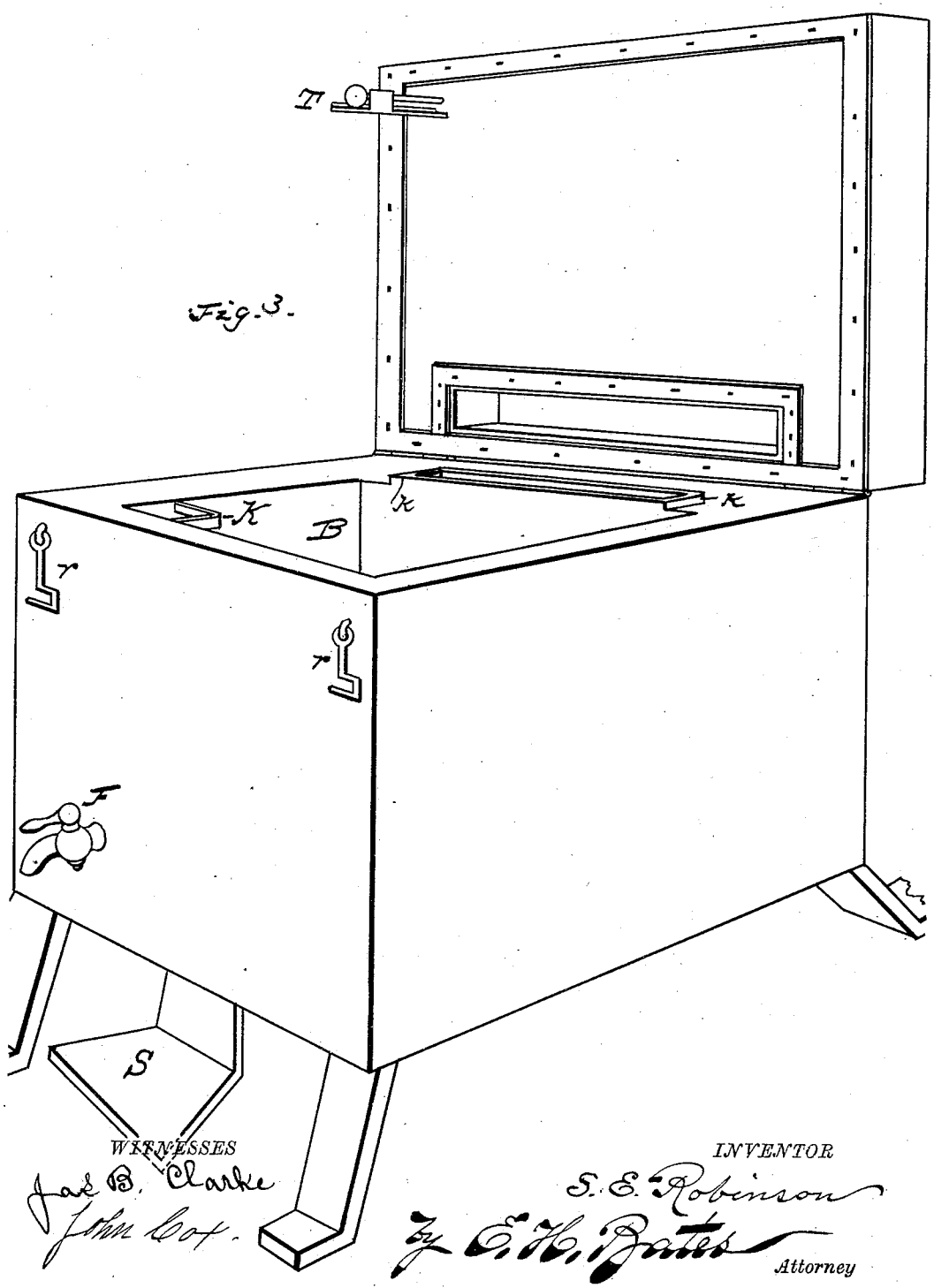

UNITED STATES PATENT OFFICE.

SYLVANUS E. ROBINSON, OF NEWARK, NEW JERSEY.

FOOD-COOKER.

SPECIFICATION forming part of Letters Patent No. 359,229, dated March 8, 1887.

Application filed July 14, 1886. Serial No. 207,971. (No model.)

*To all whom it may concern:*

Be it known that I, SYLVANUS E. ROBINSON, a citizen of the United States, residing at Newark, in the county of Essex and State of New Jersey, have invented certain new and useful Improvements in Food-Cookers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention is an improvement in food-cookers; and it consists in the novel construction and arrangement of parts, as will be hereinafter fully explained, and particularly pointed out in the appended claim.

The annexed drawings, to which reference is made, fully illustrate my invention, in which—

Figure 1 represents a vertical sectional view of my improved cooker. Fig. 2 is a horizontal section; and Fig. 3 is a perspective view of my cooker, having the lid raised, and also having the interior vessels removed therefrom.

Referring by letter to the accompanying drawings, B designates a metallic vessel or reservoir, which is designed to contain oil, fat, water, or any desired liquid suitable for the purpose for which the device is intended, and the same is heated by a lamp or gas-jet, L. The flame is applied to the bottom of the vessel B, and the heated air passes along the bottom flue and side flues into the vertical flue $o$. The opening J at the lower end of the flue is large enough to admit the lamp for producing the heat for cooking the food contained in the inner removable vessels, hereinafter set forth. The upper end of this vertical flue extends sufficiently above the top of the cooker, as at $k$, to form a flange, for a purpose to be further explained.

S indicates a stand, upon which rests the lamp or gas-jet, which stand is pivoted at $z$ to the under side of the cooker, and by turning said stand to one side the lamp can be placed thereon and brought within the opening of the flue below the cooker.

F represents a faucet, which is connected to the lower portion of the reservoir, for drawing off the liquid contained therein at pleasure.

T is a thermometer suitably attached to the cover D, and guarded when the cover is shut by a strap, K.

The reservoir B, aforesaid, is designed to receive one or more removable vessels, A, which hold the food to be cooked, and the same can be made of any suitable material, and with the legs, as shown. To retain heat in the reservoir B and vessel A, this vessel is surrounded by a jacket, C, which is designed to contain sawdust, powdered charcoal, or other non-conductor of heat. The lid or cover D also forms a jacket, which may contain non-conducting material. This cover and the flue through it may be constructed to fit closely to the top of the cooker or main body portion, and a projecting flange or continuation of the main vertical flue $o$ engages the short flue in the lid, as shown, thus forming a continuous flue from the lamp to the outlet in the cover, and a suitable packing, $p$, is provided between the cover and top of the body portion, thus rendering the interior of the same or reservoir air-tight. It will be seen by reference to Fig. 3 of the annexed drawings that raised flange $k$, or extension of the rear flue of the cooker, as well as the opening in the lid or cover, which is on the hinge side of said cover, so as not to interfere with the closing of the lid or with the convenience of access to the apparatus when open, fits over said flange, does not extend the full width of the cooker, thus allowing sufficient space on either side for the non-conducting material. This cover is provided with a fastening-hook, $r$, hinged at N, whereby the same can be readily opened, thrown back, and supported by a block, H, on the rear of the main portion.

It will be readily seen that ready access can be obtained to the interior of the cooker, and it is simple in construction, easily operated, and at the same time cheap to manufacture; and it will be further seen from the annexed drawings that the cover of the body lies upon the top of the vessels A, and serves also as a cover for said vessels; or, if desired, each vessel A may be provided with a separate cover.

Having thus described my invention, what I claim, and desire to secure by Letters Patent, is—

In a cooking apparatus of the character described, the combination, with a double-wall chest having a filling of non-conducting material, provided with a reservoir, B, and a flue, o, of a hinged cover having an aperture through it at the hinge side, and the extension k of said flue fitting closely in said aperture when the cover is closed.

In testimony whereof I affix my signature in presence of two witnesses.

SYLVANUS E. ROBINSON.

Witnesses:
J. HENRY MCNEEL,
N. M. HAMILTON.